(12) United States Patent
Zhang et al.

(10) Patent No.: US 9,965,065 B2
(45) Date of Patent: May 8, 2018

(54) TOUCH PANEL AND METHOD FOR FABRICATING THE SAME

(71) Applicant: BOE Technology Group Co., Ltd., Beijing (CN)

(72) Inventors: Fangzhen Zhang, Beijing (CN); Zhijun Lv, Beijing (CN); Tao Gao, Beijing (CN); Zhen Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days. days.

(21) Appl. No.: 14/768,360

(22) PCT Filed: Dec. 3, 2014

(86) PCT No.: PCT/CN2014/092904
§ 371 (c)(1),
(2) Date: Aug. 17, 2015

(87) PCT Pub. No.: WO2016/033887
PCT Pub. Date: Mar. 10, 2016

(65) Prior Publication Data
US 2016/0252989 A1    Sep. 1, 2016

(30) Foreign Application Priority Data
Sep. 4, 2014   (CN) .......................... 2014 1 0448652

(51) Int. Cl.
*G06F 3/041* (2006.01)
*G06F 3/044* (2006.01)

(52) U.S. Cl.
CPC ............. *G06F 3/041* (2013.01); *G06F 3/044* (2013.01)

(58) Field of Classification Search
CPC ...................................... G06F 3/044
See application file for complete search history.

(56) References Cited

U.S. PATENT DOCUMENTS

2008/0164076 A1* 7/2008 Orsley ................ G06F 3/03543
178/18.01
2011/0006401 A1* 1/2011 Chen ....................... G03F 1/144
257/618
(Continued)

FOREIGN PATENT DOCUMENTS

CN      102654806 A      9/2012
CN      103163676 A      6/2013
(Continued)

OTHER PUBLICATIONS

Jun. 12, 2015—International Search Report Appn PCT/CN2014/092904 with Eng Tran of Written Opinion.
(Continued)

*Primary Examiner* — Premal R Patel
(74) *Attorney, Agent, or Firm* — Banner & Witcoff, Ltd.

(57) ABSTRACT

A touch panel and a method for fabricating the same are disclosed. The method for fabricating the touch panel forms a pattern of a protruding structure on a base substrate by using a negative photoresist material, and the pattern of the protruding structure formed thereon is a pattern having a cross section which gradually increases from the base substrate to the outside surface and is similar to an inverted trapezoidal. Thereafter patterns of a touch electrode and dummy electrode insulated from each other are formed by using the pattern of the formed protruding structure as a mask. As the pattern of the touch electrode and the dummy electrode are disconnected through level difference of the protruding structure, the patterns of the touch electrode and the dummy electrode overlay the whole base substrate from the top view, allowing the whole surface of the touch panel to have the same optical property.

20 Claims, 4 Drawing Sheets

(56) References Cited

U.S. PATENT DOCUMENTS

| | | | | |
|---|---|---|---|---|
| 2012/0098784 | A1* | 4/2012 | Kim | G06F 3/044 345/174 |
| 2012/0227259 | A1* | 9/2012 | Badaye | G06F 3/044 29/846 |
| 2013/0056342 | A1* | 3/2013 | Wang | G06F 3/044 200/600 |
| 2013/0106441 | A1* | 5/2013 | Yilmaz | G06F 3/0414 324/658 |
| 2013/0329347 | A1* | 12/2013 | Kuo | H03K 17/962 361/679.01 |
| 2014/0055405 | A1* | 2/2014 | Ma | G06F 3/041 345/174 |
| 2014/0098305 | A1 | 4/2014 | Mo et al. | |
| 2014/0120634 | A1* | 5/2014 | Bang | H01L 27/22 438/3 |
| 2014/0152608 | A1* | 6/2014 | Peng | G01D 5/2405 345/174 |
| 2014/0184527 | A1* | 7/2014 | Kim | G06F 3/044 345/173 |
| 2014/0327845 | A1* | 11/2014 | Yashiro | G06F 3/044 349/12 |
| 2015/0309620 | A1* | 10/2015 | Shih | G06F 3/044 345/174 |

FOREIGN PATENT DOCUMENTS

| | | |
|---|---|---|
| CN | 103309095 A | 9/2013 |
| CN | 103577005 A | 2/2014 |
| CN | 103631428 A | 3/2014 |
| CN | 103853401 A | 6/2014 |

OTHER PUBLICATIONS

Oct. 19, 2016—(CN) First Office Action Appn 201410448652.1 with English Tran.
Feb. 21, 2017—(CN) Second Office Action Appn 201410448652.1 with English Tran.
Mar. 8, 2018—(EP) Search Report for application EP 14881401.5.

* cited by examiner

TOUCH PANEL AND METHOD FOR FABRICATING THE SAME

The application is a U.S. National Phase Entry of International Application No. PCT/CN2014/092904 filed on Dec. 3, 2014, designating the United States of America and claiming priority to Chinese Patent Application No. 201410448652.1 filed on Sep. 4, 2014. The present application claims priority to and the benefit of the above-identified applications and the above-identified applications are incorporated by reference herein in their entirety.

FIELD OF THE ART

Embodiments of the invention relate to a touch panel and a method for fabricating the same.

BACKGROUND

With the rapid development of display technologies, touch screen panels are frequently used in our daily life. Manufacturers generally use a design of a single electrically conductive layer to fabricate the touch panels to reduce the fabricating cost. That is, a single metal layer is deposited on a substrate, and then a touch electrode is formed through a patterning process. In such a design, due to different refractive indices of the single electrically conductive layer and the substrate, reflectance by the metal will make the pattern of the metal touch electrode visible to users, thereby compromising the visual effect of the touch panel. Due to the above fact, an anti-reflection layer is needed, which will again increase both the complexity of the fabricating process and the fabrication cost of the touch panel. Moreover, the effect of the anti-reflection layer is too limited to effectively improve the visual effect of the touch panel.

SUMMARY

A first aspect of the invention provides a touch panel, comprising: a base substrate, a protruding structure disposed on the base substrate, as well as a touch electrode and a dummy electrode which are disposed on the protruding structure and the base substrate and configured as being insulated from each other; wherein a width of a cross section of the protruding structure gradually increases along a direction away from the base substrate; the protruding structure allows the touch electrode and the dummy electrode to be disconnected at an edge of the protruding structure.

As an example, a pattern of the touch electrode and that of the protruding structure are identical to each other, and a pattern of the dummy electrode and that of the protruding structure are complementary with each other.

As an example, a pattern of the touch electrode and that of the protruding structure are complementary with each other, and a pattern of the dummy electrode and that of the protruding structure are identical to each other.

As an example, a thickness of the protruding structure is larger than that of the touch electrode and is also larger than that of the dummy electrode.

As an example, the touch electrode comprises a touch sensing electrode and a touch driving electrode which forming an interdigitated structure.

As an example, the protruding structure is made of an insulating material.

As an example, the protruding structure is made of a negative photoresist material.

A second aspect of the invention further provides a method for fabricating a touch panel. The method comprises:

forming a pattern of a protruding structure on a base substrate, wherein a width of a cross section of the protruding structure gradually increased along a direction away from the base substrate; and forming a pattern of a touch electrode and a pattern of a dummy electrode insulated from each other by using the pattern of the protruding structure as a mask on the base substrate having the pattern of the protruding structure formed thereon.

As an example, the pattern of the protruding structure formed on the base substrate is made of an insulating material.

As an example, the step of forming the pattern of a touch electrode and the pattern of a dummy electrode insulated from each other by using the pattern of the protruding structure as a mask on the base substrate having the pattern of the protruding structure formed thereon comprises:

forming a layer of electrically conductive material with a thickness smaller than that of the protruding structure on the base substrate having the pattern of the protruding structure formed thereon, disconnecting the electrically conductive material on an edge of the protruding structure, and forming the pattern of the touch electrode and the pattern dummy electrode insulated from each other.

As an example, the pattern of the touch electrode is formed as being identical to that of the protruding structure and the pattern of the dummy electrode is formed as being complementary with that of the protruding structure.

As an example, the step of forming the pattern of the protruding structure on the base substrate comprises:

forming a layer of a negative photoresist material on the base substrate;

exposing and developing the negative photoresist material using a first mask, wherein a light-transmitting area of the first mask corresponds to an area to form the pattern of the touch electrode and a light shielding area of the first mask corresponds to an area to form the pattern of the dummy electrode.

As an example, the pattern of the dummy electrode is formed as being identical to that of the protruding structure and the pattern of the touch electrode is formed as being complementary with that of the protruding structure.

As an example, the step of forming the pattern of the protruding structure on the base substrate comprises:

forming a layer of negative photoresist material on the base substrate;

exposing and developing the negative photoresist material using a first mask, wherein a light-shielding area of the first mask corresponds to an area to form the pattern of the touch electrode and a light-transmitting area of the first mask corresponds to an area to form the pattern of the dummy electrode.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to clearly illustrate the technical solution of the embodiments of the invention, the drawings of the embodiments will be briefly described in the following; it is obvious that the described drawings are only related to some embodiments of the invention and thus are not limitative of the invention. Based on the described embodiments herein, those skilled in the art can obtain other embodiment(s), without any inventive work, which should be within the scope of the invention.

Figure 1:
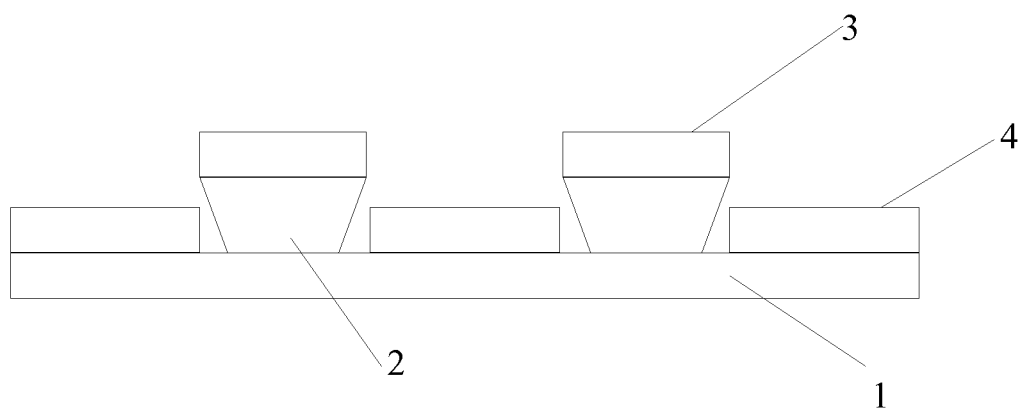
FIG. 1 schematically illustrates a cross section of a touch panel in accordance with an embodiment of the invention.
Figure 2:
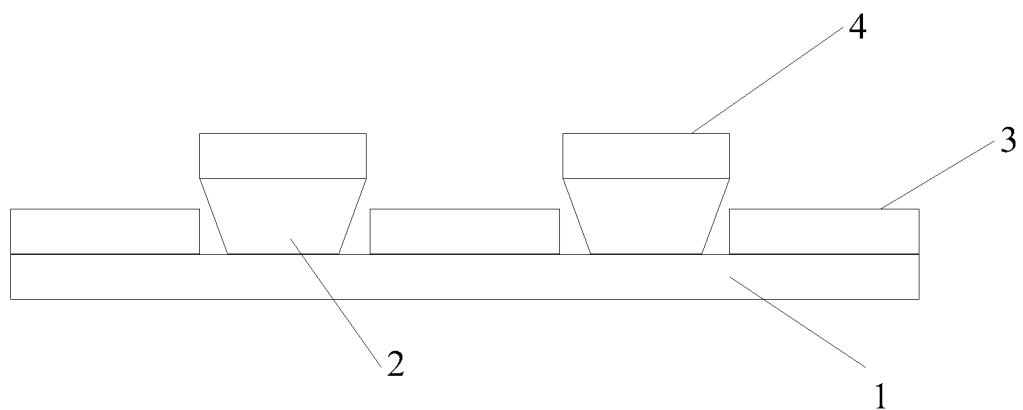
FIG. 2 schematically illustrates a cross section of another touch panel in accordance with an embodiment of the invention.

An embodiment of the invention provides a touch panel, as illustrated in FIGS. 1 and 2, which comprises: a base substrate 1, a protruding structure 2 disposed on the base substrate 1, as well as a touch electrode 3 and a dummy electrode 4 which are disposed on the protruding structure 2 and the base substrate 1 and configured as being insulated from each other.

A width of a cross section of the protruding structure 2 gradually increases along a direction away from the base substrate 1 to form a pattern similar to an inverted trapezoidal. The protruding structure 2 allows the touch electrode 3 and the dummy electrode 4 to be disconnected at an edge of the protruding structure 2, thereby guaranteeing that the touch electrode 3 and the dummy electrode 4 are insulated from each other.

In the touch panel provided by the above embodiment of the invention, a pattern of the touch electrode 3 and that of the dummy electrode 4 are disconnected through a level difference of the protruding structure 2. Moreover, the patterns of the touch electrode 3 and the dummy electrode 4 overlay the whole base substrate 1 from the top view, allowing the whole surface of the touch panel to have the same optical property, thereby reducing or eliminating the influence on the visual effect by the patterns of the touch electrode 3 in the touch panel, and improving the visual effect of the whole touch panel. Comparing with the fabricating process of the conventional touch panels, the present invention can still achieve a relatively good visual effect without the need for the anti-reflection layer, thereby reducing the fabricating cost.

As an example, the touch electrode 3 and the dummy electrode 4 may be arranged on the base substrate 1 in two ways. As an example, as illustrated in FIG. 1, the pattern of the touch electrode 3 and that of the protruding structure 2 are configured as being identical and the pattern of the dummy electrode 4 and that of the protruding structure 2 are configured as being complementary. Alternatively, as illustrated in FIG. 2, the pattern of the touch electrode 3 and that of the protruding structure 2 are configured as being complementary and the pattern of the dummy electrode 4 and that of the protruding structure 2 are configured as being identical. The touch electrode 3 and the dummy electrode 4 arranged in both the above ways overlap the whole base substrate 1, allowing the whole surface of the touch panel has an identical optical property, thereby reducing or eliminating the influence on the visual effect by the pattern of the touch electrode 3 in the touch panel, and improving the overall visual effect of the whole touch panel.

As an example, to keep the touch electrode 3 and the dummy electrode 4 insulated from each other, a thickness of the protruding structure 2 is larger than that of the touch electrode 3 and that of the dummy electrode 4. In this way, when electrically conductive materials are deposited on the base substrate 1 having the protruding structure 2 formed thereon by using the pattern of the protruding structure 2 as a mask, the electrically conductive materials are naturally disconnected at the level difference of the protruding structure 2, thereby forming the pattern of the touch electrode 3 and that of the dummy electrode 4.

Figure 3:
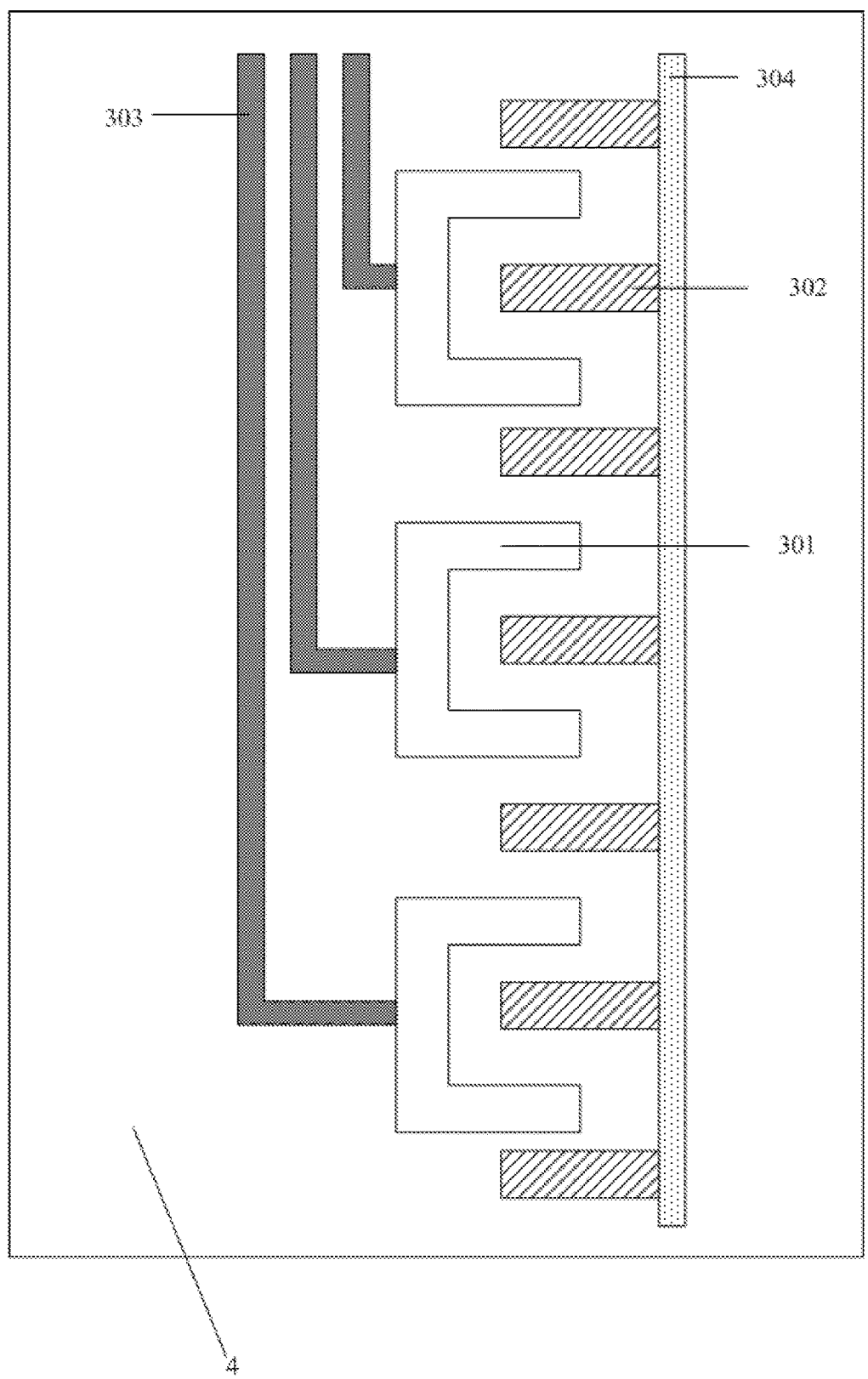
FIG. 3 schematically illustrates a plan view of a touch electrode in accordance with an embodiment of the invention.
Figure 4:
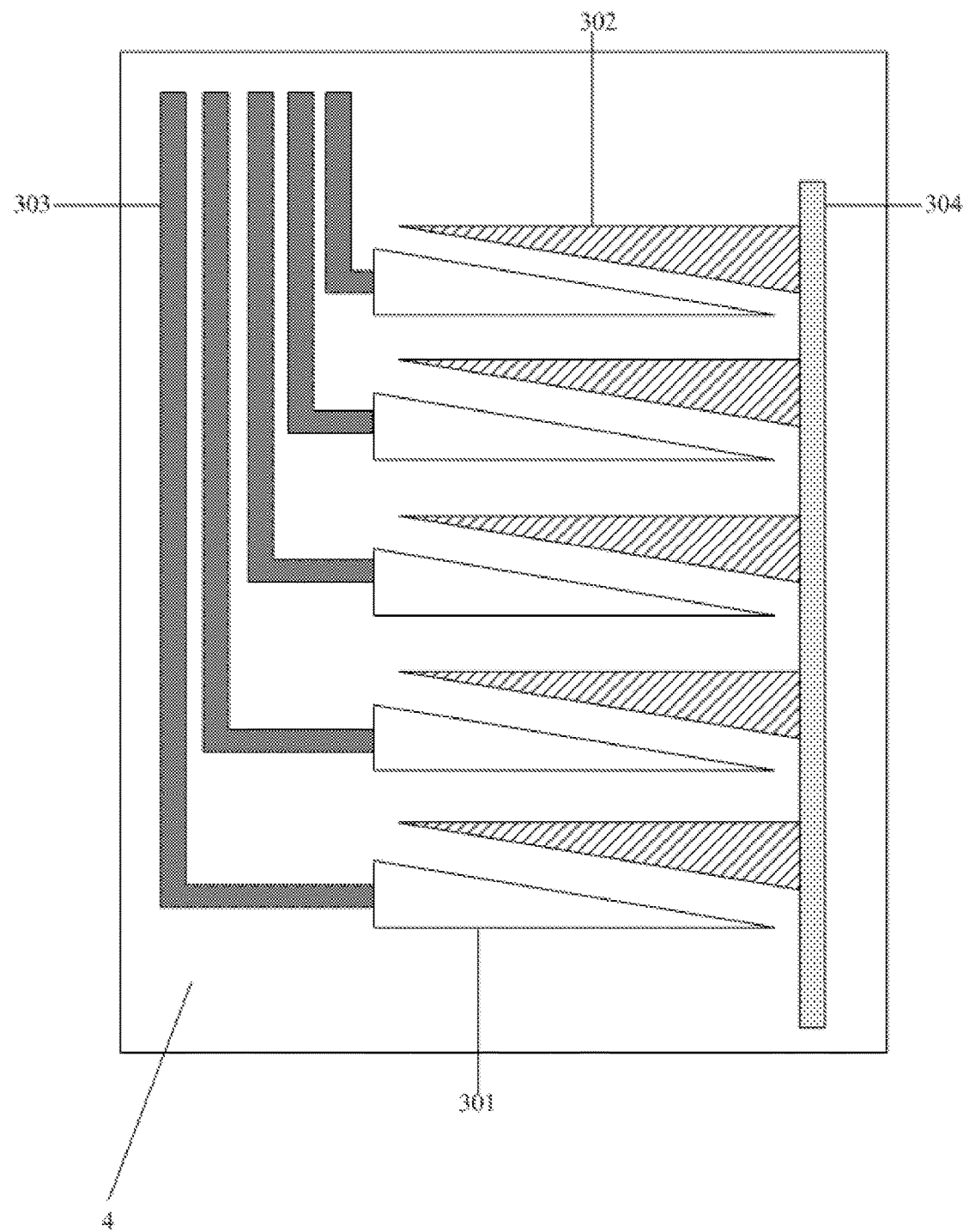
FIG. 4 schematically illustrates a plan view of another touch electrode in accordance with an embodiment of the invention.

As an example, to realize the touch function, the touch electrode 3 comprises a touch sensing electrode 301 and a touch driving electrode 302; the touch sensing electrode 301 is typically connected to a touch signal output line 303, and the touch driving electrode 302 is typically connected to a drive line 304. Moreover, to keep the touch sensing electrode 301 and the touch driving electrode 302 insulated from each other in a plane, the touch sensing electrode 301 and the touch driving electrode 302 may be configured as being an interdigitated structure, wherein the interdigitated structure may have multiple implementations. For example, as illustrated in FIG. 3, a pattern of the touch sensing electrode 301 is U-shaped; correspondingly a pattern of the touch driving electrode 302 is a rectangle which inserts into the opening portion of the U-shaped pattern, thereby forming the interdigitated structure and the remaining blank part forming the dummy electrodes 4. Alternatively, as illustrated in FIG. 4, a pattern of the touch sensing electrode 301 is a triangle; correspondingly a pattern of the touch driving electrode 302 is a triangle with a hypotenuse opposite to the hypotenuse of the touch sensing electrode 301. In this way, the touch driving electrode and the touch sensing electrode are complementary with each other and form a structure similar to an interdigitated structure, and the rest blank part will be the dummy electrode 4. In detailed implementations, the patterns of the touch sensing electrode 301 and the touch driving electrode 302 may be other patterns meeting the process requirements, which will not be defined here.

As an example, a material of the protruding structure 2 may be silicon nitride, silicon dioxide or other insulating materials. For example, the material of the protruding structure 2 is preferably a negative photoresist material. A protruding structure made of a negative photoresist material can achieve the function of insulation and easily realize the chamfering patterning process, which is advantageous to fabricating the pattern of the protruding structure 2 having a cross section of an inverted trapezoidal.

Figure 5:
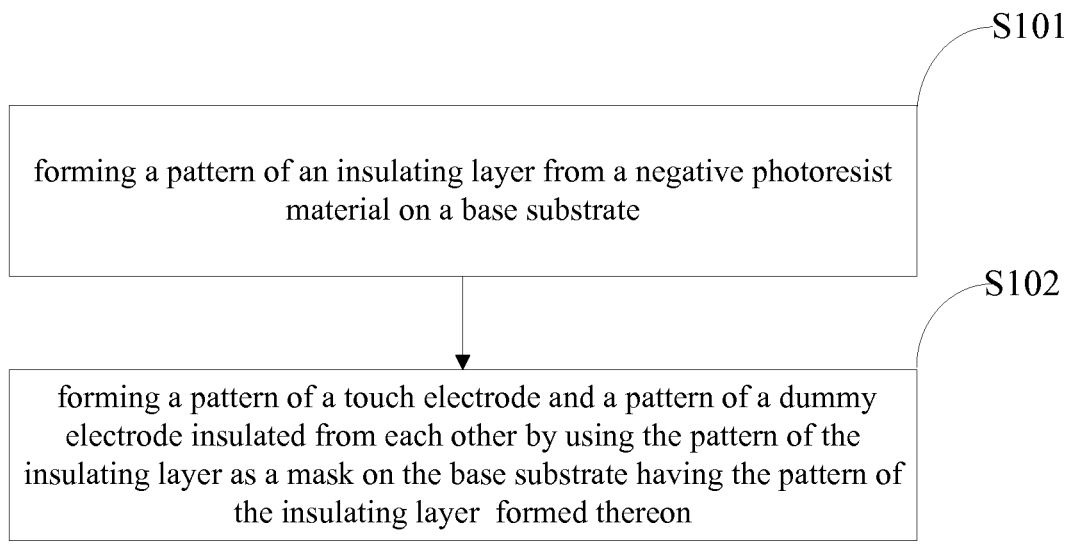
FIG. 5 schematically illustrates a flow chart of a method for fabricating a touch panel in accordance with an embodiment of the invention.

An embodiment of the invention further provides a method for fabricating a touch panel, as illustrated in FIG. 5. The method comprises the following steps:

S101, forming a pattern of a protruding structure on a base substrate, wherein a width of a cross section of the protruding structure gradually increases along a direction away from the base substrate;

S102, forming a pattern of a touch electrode and a pattern of a dummy electrode insulated from each other by using the pattern of the protruding structure as a mask on the base substrate having the pattern of the protruding structure formed thereon.

In the method for fabricating the touch panel provided by the embodiment of the invention, as the pattern of the protruding structure is formed by using a negative photoresist material on the base substrate, the pattern of the protruding structure formed therefrom is one having a cross section which gradually increases from the base substrate to the outside surface and is similar to an inverted trapezoidal. As a result, the patterns of the touch electrode and the dummy electrode formed by using the pattern of the protruding structure as a mask are disconnected at the level difference of the protruding structure and insulated from each other. In the meantime, the patterns of the touch electrodes and the dummy electrodes overlay the whole base substrate from a top view, allowing the whole surface of the touch panel to have the same optical property, thereby reducing or eliminating the influence on the visual effect by the pattern of the touch electrode 3 in the touch panel, and improving the visual effect of the whole touch panel. Comparing with the fabricating process of the conventional touch panels, the present invention can still achieve a relatively good visual effect without the need for the anti-reflection layer, thereby reducing the fabricating cost.

As an example, a material of the protruding structure 2 may generally be silicon nitride, silicon dioxide or other insulating materials. For example, the protruding structure 2 is made of a negative photoresist material, which can achieve the function of insulation and easily realize the chamfering patterning process, therefore being advantageous to fabricating the pattern of the protruding structure 2 having a cross section of an inverted trapezoidal.

As an example, to allow the touch electrode and the dummy electrode formed by using the pattern of the protruding structure as the mask to be insulated from each other, step S102 of the method for fabricating the touch panel provided by the embodiment of the invention may be implemented in the following way: forming a layer of electrically conductive material with a thickness smaller than that of the protruding structure on the base substrate having the pattern of the protruding structure formed thereon. As the pattern of the protruding structure formed in step S101 is one having a cross section which gradually increases from the base substrate to the outside surface and is similar to an inverted trapezoidal, by using the pattern of the protruding structure formed in step 101 as the mask, the electrically conductive material having a thickness smaller than that of the protruding structure will naturally disconnected at the level difference of the protruding structure. The disconnected electrically conductive material respectively forms two parts of pattern, thereby automatically forming the patterns of the touch electrode and dummy electrode which are insulated from each other.

The patterns of the touch electrode and dummy electrode insulated from each other are formed with step S102. As the pattern formed above the pattern of the protruding structure is identical to the pattern of the protruding structure, as illustrated in FIG. 1, the pattern of the touch electrode 3 may be configured as identical to the pattern of the protruding structure 2, and correspondingly, the pattern of the dummy electrode 4 is configured as complementary with the pattern of the protruding structure 2.

Furthermore, to realize the touch electrode 3 and dummy electrode 4 having the above structure, step S101 for example comprises the following steps:

S201, forming a layer of negative photoresist material on the base substrate;

S202, exposing and developing the negative photoresist material using a first mask, wherein a light-transmitting area of the first mask corresponds to an area to form the pattern of the touch electrode and a light-shielding area of the first mask corresponds to an area to form the pattern of the dummy electrode. Thus, after the exposure and development, the negative photoresist corresponding to the light-transmitting area of the first mask is retained, with a pattern of the retained area being identical to the pattern of the touch electrode; a negative photoresist corresponding to the light-shielding area is etched away, with a pattern of the etched area being identical to the pattern of the dummy electrode.

The patterns of the touch electrode and dummy electrode insulated from each other are formed in the step S102. As the pattern formed above the pattern of the protruding structure is identical to the pattern of the protruding structure, thus, as illustrated in FIG. 2, the pattern of the dummy electrode 4 may be also configured as identical to the pattern of the protruding structure 2, and correspondingly, the pattern of the touch electrode 3 is configured as complementary with the pattern of the protruding structure 2.

Furthermore, to realize the dummy electrode 4 and touch electrode 3 having the above structure, the step S101 for example comprises the following steps:

S301, forming a layer of negative photoresist material on the base substrate;

S302, exposing and developing the negative photoresist material using a first mask, wherein a light-shielding area of the first mask corresponds to an area to form the pattern of the touch electrode and a light-transmitting area of the first mask corresponds to an area to form the pattern of the dummy electrode. Thus, after the exposure and development, a negative photoresist corresponding to the light-transmitting area of the first mask is retained, with a pattern of the retained area being identical to the pattern of the dummy electrode, a negative photoresist corresponding to the light-shielding area is etched, and with a pattern of the etched area being identical to the pattern of the touch electrode.

Specifically, in the touch panel and the method for fabricating the same provided by the embodiments of the invention, the material of the protruding structure may also be an organic photoresist material, an inorganic material, or any other material which may form a pattern having a cross section of inverted trapezoidal through an exposure etching process and is insulated and transparent.

The method for fabricating the touch panel provided by the embodiment of the invention can be adopted in multiple touch technical solutions such as on-cell touch solutions or in-cell touch solutions. Corresponding process steps are additionally needed when the method is adopted in different touch technical solutions to meet the requirements of the corresponding solution, which will not be elaborated herein.

The embodiments of the invention provide a touch panel and a method for fabricating the same. The method for fabricating the touch panel forms the pattern of the protruding structure on the base substrate by using a negative photoresist material. The pattern of the protruding structure formed thereon is a pattern having a cross section which gradually increases from the base substrate to the outside surface and is similar to an inverted trapezoidal. Thereafter the patterns of the touch electrode and dummy electrode insulated from each other are formed by using the pattern of the protruding structure formed thereon as the mask. As the pattern of the touch electrode and that of the dummy electrode are disconnected through level difference of the protruding structure, the patterns of the touch electrode and the dummy electrode overlay the whole base substrate from the top view, allowing the whole surface of the touch panel to have the same optical property, thereby reducing or eliminating the influence on the visual effect by the patterns of the touch electrode in the touch panel, and improving the visual effect of the whole touch panel. Comparing with the fabricating process of the conventional touch panels, the present invention can still achieve a relatively good visual effect without the need for the anti-reflection layer, thereby reducing the fabricating cost.

What is described above is related to exemplary embodiments of the disclosure only and is not limitative to the scope of the disclosure; the scopes of the disclosure are defined by the accompanying claims.

This application claims the priority of Chinese Patent Application No. 201410448652.1, filed on Sep. 4, 2014, the disclosure of which is hereby incorporated by reference in its entirety.

What is claimed is:

1. A touch panel, comprising: a base substrate, a protruding structure disposed on the base substrate, as well as a touch electrode and a dummy electrode which are disposed on the protruding structure and the base substrate and configured as being insulated from each other;
   wherein a width of a cross section of the protruding structure gradually increases along a direction away from the base substrate;
   the protruding structure allows the touch electrode and the dummy electrode to be disconnected at an edge of the protruding structure;
   wherein the touch electrode comprises a touch sensing electrode and a touch driving electrode, the touch sensing electrode and the touch driving electrode are both disposed on the protruding structure, a pattern of the touch sensing electrode consists of a plurality of single U-shaped portions which are equally spaced from each other, and a pattern of the touch driving electrode consists of a plurality of rectangle portions which are equally spaced from each other, the plurality of rectangle portions in even rows insert into an opening portion of the plurality of single U-shaped portions, such that the touch sensing electrode and the touch driving electrode form an interdigital structure, the plurality of rectangle portions in singular rows are suspended; and
   wherein the plurality of single U-shaped portions are electrically and physically disconnected with each other, and the plurality of rectangle portions are physically disconnected with each other but electrically connected with each other through a same drive line.

2. The touch panel of claim 1, wherein a pattern of the touch electrode and that of the protruding structure are identical to each other and a pattern of the dummy electrode and that of the protruding structure are complementary with each other.

3. The touch panel of claim 1, wherein a pattern of the touch electrode and that of the protruding structure are complementary with each other and a pattern of the dummy electrode and that of the protruding structure are identical to each other.

4. The touch panel of claim 1, wherein a thickness of the protruding structure is larger than that of the touch electrode and larger than that of the dummy electrode.

5. The touch panel of claim 1, wherein the protruding structure is made of an insulating material.

6. The touch panel of claim 5, wherein the protruding structure is made of a negative photoresist material.

7. The touch panel of claim 1, wherein each of the U-shaped portions is connected to a touch signal output line, all of the rectangle-shaped portions is connected to the same drive line, and touch signal output lines are extended parallel to the drive line.

8. The touch panel of claim 1, wherein a pattern of the touch electrode and that of the protruding structure are complementary with each other and a pattern of the dummy electrode and that of the protruding structure are identical to each other.

9. The touch panel of claim 1, wherein a thickness of the protruding structure is larger than that of the touch electrode and larger than that of the dummy electrode.

10. The touch panel of claim 1, wherein the protruding structure is made of an insulating material.

11. A method for fabricating a touch panel, comprising:
    forming a pattern of a protruding structure on a base substrate, wherein a width of a cross section of the protruding structure gradually increases along a direction away from the base substrate; and
    forming a pattern of a touch electrode and a pattern of a dummy electrode insulated from each other by using the pattern of the protruding structure as a mask on the base substrate having the pattern of the protruding structure formed thereon;
    wherein the touch electrode comprises a touch sensing electrode and a touch driving electrode, the touch sensing electrode and the touch driving electrode are both disposed on the protruding structure, a pattern of the touch sensing electrode consists of a plurality of single U-shaped portions which are equally spaced from each other, and a pattern of the touch driving electrode consists of a plurality of rectangle portions which are equally spaced from each other, the plurality of rectangle portions in even rows insert into an opening portion of the plurality of single U-shaped portions, such that the touch sensing electrode and the touch driving electrode form an interdigital structure, the plurality of rectangle portions in singular rows are suspended; and
    wherein the plurality of single U-shaped portions are electrically and physically disconnected with each other, and the plurality of rectangle portions are physically disconnected with each other but electrically connected with each other through a same driving line.

12. The method of claim 11, wherein the pattern of the protruding structure formed on the base substrate is made of an insulating material.

13. The method of claim 11, wherein the step of forming a pattern of a touch electrode and a pattern of a dummy electrode insulated from each other by using the pattern of the protruding structure as a mask on the base substrate having the pattern of the protruding structure formed thereon comprises:
    forming a layer of electrically conductive material with a thickness smaller than that of the protruding structure on the base substrate having the pattern of the protruding structure formed thereon, disconnecting the electrically conductive material at an edge of the protruding structure, and forming the patterns of the touch electrode and dummy electrode insulated from each other.

14. The method of claim 13, wherein the pattern of the touch electrode is formed as being identical to that of the protruding structure and the pattern of the dummy electrode is formed as being complementary with that of the protruding structure.

15. The method of claim 14, wherein the step of forming the pattern of the protruding structure on the base substrate comprises:

forming a layer of a negative photoresist material on the base substrate; and exposing and developing the negative photoresist material using a first mask, wherein a light-transmitting area of the first mask corresponds to an area to form the pattern of the touch electrode and a light shielding area of the first mask corresponds to an area to form the pattern of the dummy electrode.

16. The method of claim 13, wherein the pattern of the dummy electrode is formed as being identical to that of the protruding structure and the pattern of the touch electrode is formed as being complementary with that of the protruding structure.

17. The method of claim 16, wherein the step of forming the pattern of the protruding structure on the base substrate comprises:

forming a layer of negative photoresist material on the base substrate; and exposing and developing the negative photoresist material using a first mask, wherein a light-shielding area of the first mask corresponds to an area to form the pattern of the touch electrode and a light-transmitting area of the first mask corresponds to an area to form the pattern of the dummy electrode.

18. A touch panel, comprising:

a base substrate;

a protruding structure disposed on the base substrate; and a touch electrode and a dummy electrode disposed on the protruding structure and the base substrate and configured as being insulated from each other, wherein the protruding structure allows the touch electrode and the dummy electrode to be disconnected at an edge of the protruding structure;

wherein a width of a cross section of the protruding structure gradually increases along a direction away from the base substrate;

wherein the touch electrode comprises a touch sensing electrode and a touch driving electrode, the touch sensing electrode and the touch driving electrode are both disposed on the protruding structure, a pattern of the touch sensing electrode consists of a plurality of triangle portions which are equally spaced from each other, and a pattern of the touch driving electrode consists of a plurality of triangle portions with a hypotenuse opposite to a hypotenuse of the touch sensing electrode, the plurality of triangle portions of the touch driving electrode are equally spaced from each other, such that the touch sensing electrode and the touch driving electrode form an interdigital structure; and wherein the plurality of triangle portions of the pattern of the touch sensing electrode are electrically and physically disconnected with each other, and the plurality of triangle portions of the pattern of the touch driving electrode are physically disconnected with each other but electrically connected with each other through a same drive line.

19. The touch panel of claim 18, wherein each of the triangle portions of the touch sensing electrode is connected to a touch signal output line, all of the triangle portions of the touch driving electrode is connected to the same drive line, and touch signal output lines are extended parallel to the drive line.

20. The touch panel of claim 18, wherein a pattern of the touch electrode and that of the protruding structure are identical to each other and a pattern of the dummy electrode and that of the protruding structure are complementary with each other.

* * * * *